(12) United States Patent
Moxon (10) Patent No.: US 10,794,617 B2
(45) Date of Patent: Oct. 6, 2020

(54) THERMAL MANAGEMENT SYSTEM

(71) Applicant: ROLLS-ROYCE plc, London (GB)

(72) Inventor: Matthew Moxon, Derby (GB)

(73) Assignee: ROLLS-ROYCE plc, London (GB)

( * ) Notice: Subject to any disclaimer, the term of this patent is extended or adjusted under 35 U.S.C. 154(b) by 80 days.

(21) Appl. No.: 16/142,362

(22) Filed: Sep. 26, 2018

(65) Prior Publication Data
US 2019/0128570 A1    May 2, 2019

(30) Foreign Application Priority Data

Nov. 2, 2017  (GB) .................................. 1718141.3

(51) Int. Cl.
| | |
|---|---|
| F25B 11/04 | (2006.01) |
| B64D 27/02 | (2006.01) |
| B64D 35/04 | (2006.01) |
| H01M 10/613 | (2014.01) |
| H01M 10/625 | (2014.01) |
| H01M 10/6556 | (2014.01) |
| H01M 10/6567 | (2014.01) |
| H01M 10/663 | (2014.01) |
| B64D 13/06 | (2006.01) |

(Continued)

(52) U.S. Cl.
CPC .............. *F25B 11/04* (2013.01); *B64D 13/06* (2013.01); *B64D 27/02* (2013.01); *B64D 27/24* (2013.01); *B64D 35/04* (2013.01); *F02C 7/14* (2013.01); *H01M 8/04029* (2013.01); *H01M 10/613* (2015.04); *H01M 10/625* (2015.04); *H01M 10/6556* (2015.04); *H01M 10/6567* (2015.04); *H01M 10/663* (2015.04); *H02K 9/19* (2013.01); *H02K 11/0094* (2013.01); *B64D 2013/0603* (2013.01); *B64D 2013/0618* (2013.01);

(Continued)

(58) Field of Classification Search
CPC ......... F25B 11/04; B64D 27/24; B64D 27/02; B64D 13/06; F02C 7/14; H01M 10/613
See application file for complete search history.

(56) References Cited

U.S. PATENT DOCUMENTS 7,228,707 B2 * 6/2007 Lifson ....................... F25B 5/00
  62/510
9,649,909 B2 * 5/2017 Enomoto .................. B60K 6/22
(Continued)

FOREIGN PATENT DOCUMENTS

| | | |
|---|---|---|
| GB | 2 539 756 A | 12/2016 |
| WO | WO2015133083 | 9/2015 |

OTHER PUBLICATIONS

Great Britain Search Report dated May 2, 2018, issued in Great Britain Patent Application No. 1718141.1.

*Primary Examiner* — Shafiq Mian
(74) *Attorney, Agent, or Firm* — Oliff PLC (57) ABSTRACT

A thermal management system comprises a first heat exchanger configured to exchange heat between a first component and a first working fluid, a first working fluid compressor downstream in first working fluid flow of the first heat exchanger and configured to compress the first working fluid, a second heat exchanger downstream in first working fluid flow of the compressor and configured to exchange heat between the first working fluid and a second working fluid and an expander downstream in first working fluid flow of the second heat exchanger, and configured to expand and cool first working fluid and deliver cooled first working fluid to the first heat exchanger. The system further comprises a third heat exchanger upstream in second working fluid flow of the second heat exchanger, and configured to exchange heat between a second component and the second working fluid.

16 Claims, 6 Drawing Sheets

(51) Int. Cl.
  *B64D 27/24* (2006.01)
  *F02C 7/14* (2006.01)
  *H01M 8/04029* (2016.01)
  *H02K 9/19* (2006.01)
  *H02K 11/00* (2016.01)

(52) U.S. Cl.
  CPC ............... *B64D 2013/0625* (2013.01); *B64D 2027/026* (2013.01); *F05D 2220/32* (2013.01); *F05D 2220/76* (2013.01); *F05D 2260/20* (2013.01); *H01M 2220/20* (2013.01); *H01M 2250/20* (2013.01)

(56) References Cited

U.S. PATENT DOCUMENTS

| | | | |
|---|---|---|---|
| 2003/0167791 A1* | 9/2003 | Chordia | F25B 9/008 |
| | | | 62/498 |
| 2012/0247716 A1 | 10/2012 | Galtz et al. | |
| 2015/0273976 A1* | 10/2015 | Enomoto | B60K 6/22 |
| | | | 165/202 |
| 2016/0001634 A1* | 1/2016 | Terada | B60H 1/00007 |
| | | | 62/160 |
| 2016/0176529 A1* | 6/2016 | Gagne | F02C 7/32 |
| | | | 244/58 |
| 2017/0008373 A1* | 1/2017 | Makihara | B60K 11/02 |
| 2017/0106985 A1* | 4/2017 | Stieger | F02C 9/18 |
| 2018/0001737 A1* | 1/2018 | Graaf | B60H 1/3211 |

* cited by examiner

THERMAL MANAGEMENT SYSTEM

CROSS-REFERENCE TO RELATED APPLICATIONS

This application is based upon and claims the benefit of priority from British Patent Application No. GB 1718141.3, filed on 2 Nov. 2017, the entire contents of which are incorporated by reference.

BACKGROUND

Technical Field

The present disclosure concerns a thermal management system, particularly though not exclusively, a cooling system for a battery powered aircraft, and a vehicle comprising the thermal management system.

Description of the Related Art

Aircraft generally require one or more cooling systems to cool components such as oil systems, batteries, electric motors etc. Some of these systems (in particular, batteries) may also require heating under some circumstances. However, the typical operating temperatures of these systems varies considerably, with some components requiring relatively low operational temperatures (in particular batteries, which require relatively low temperatures of around 60-70° C.), with others being able to accommodate relatively higher temperatures (e.g. electric motors may be able to accommodate temperatures of around 100 to 150° C.). Conventionally, each of these heat sources requires a separate heat exchanger to reject heat to the environment, in view of the different temperature. It is undesirable to mix hot coolant from different sources, as the resultant cooler coolant will generally require a larger heat exchanger to dissipate the necessary heat to return the coolant to the temperature required by the lower temperature heat component. Since each heat exchanger requires additional weight, and represents a source of aerodynamic drag where the heat exchanger exchanges heat with ambient air, traditional heat exchange systems result in decreased overall aircraft efficiency. Similar issues occur in other vehicle types, such as cars, trucks etc.

Aircraft component cooling integration has long been considered an important aspect in aircraft design, particularly for piston engine aircraft. For example, the BMW 801 powered FW190 aircraft comprised a propeller spinner mounted duct fan, configured to cool both an oil cooler and engine cylinders of the BMW801 radial engine. Consequently, it will be understood that further optimisation with regard to integration of the cooling system will result in significant aircraft level efficiency improvement.

SUMMARY

Accordingly, there is a need for a vehicle cooling system that minimises the weight and volume of the heat exchangers, while enabling different components to cooled to their required temperatures.

According to a first aspect there is provided a thermal management system comprising:
a first heat exchanger configured to exchange heat between a first component and a first working fluid;
a first working fluid compressor downstream in first working fluid flow of the first heat exchanger and configured to compress the first working fluid;
a second heat exchanger downstream in first working fluid flow of the compressor and configured to exchange heat between the first working fluid and a second working fluid;
an expander downstream in first working fluid flow of the second heat exchanger, and configured to expand and cool first working fluid and deliver cooled first working fluid to the first heat exchanger;
a third heat exchanger upstream in second working fluid flow of the second heat exchanger, and configured to exchange heat between a second component and the second working fluid; and
a fourth heat exchanger downstream in second working fluid flow of the second heat exchanger configured to exchange heat between the second working fluid and a third working fluid.

The first component may comprise one or more of a chemical battery and a fuel cell. The fuel cell may comprise a liquid fuel cell such as a hydrogen fuel cell, or may comprise a metal-air battery such as a lithium battery. The second component may comprise an electric motor.

The expander may comprise one of a throttle and a turbine. Where the expander comprises a turbine, the turbine may be coupled to the compressor by a heat pump shaft.

The third working fluid may comprise air, and the fourth heat exchanger may be provided within an air duct. The air duct may comprise a diffuser upstream of the fourth heat exchanger and a convergent portion downstream of the fourth heat exchanger. Advantageously in vehicular applications, the air duct provides thrust, and thereby recovers energy rejected by the heat pump.

The air duct comprises an inlet configured to receive exhaust air from a cabin air exhaust of an environmental control system. The air duct may be provided having an inlet in a propulsor slipstream, or may be located at an aft portion of an aircraft adjacent a tail.

Alternatively, the third working fluid may comprise liquid fuel.

According to a second aspect there is provided a vehicle such as an aircraft comprising a cooling system according to the first aspect.

The aircraft may comprise one or more propulsors driven by a respective electric motor cooled by the cooling system. Separate cooling systems may be provided for each motor. The electric motor may be powered by a battery cooled by the cooling system.

The aircraft may optionally comprise one or more heat engines such as gas turbine engines configured to drive a or a plurality of generators. The generator(s) may be electrically coupled to the battery and/or the electric motor. The third working fluid may comprise liquid fuel for the heat engine. The generators may comprise motor-generators configured to operate as an electric motor or as an electric generator. The system may be particularly suitable for use with an aircraft such as that shown in applicant's patent GB2539756, incorporated herein by reference. In such an application, the first working fluid may be employed to cool and/or heat the motor-generator.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
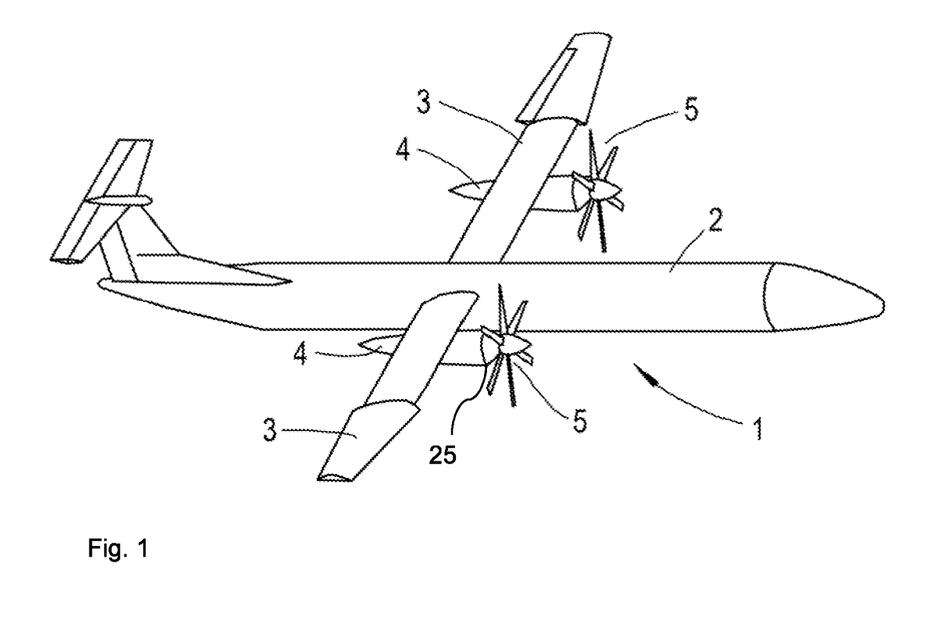
FIG. 1 is a perspective schematic view of an aircraft in accordance with the present disclosure.

With reference to FIG. 1, an aircraft 1 is shown. The aircraft 1 comprises a fuselage 2 with a pair of wings 3 mounted thereto. Propulsors in the form of propellers 5 are mounted to the wings 3 via respective nacelles 4. The propellers 5 provide propulsive power in flight.

Figure 2:
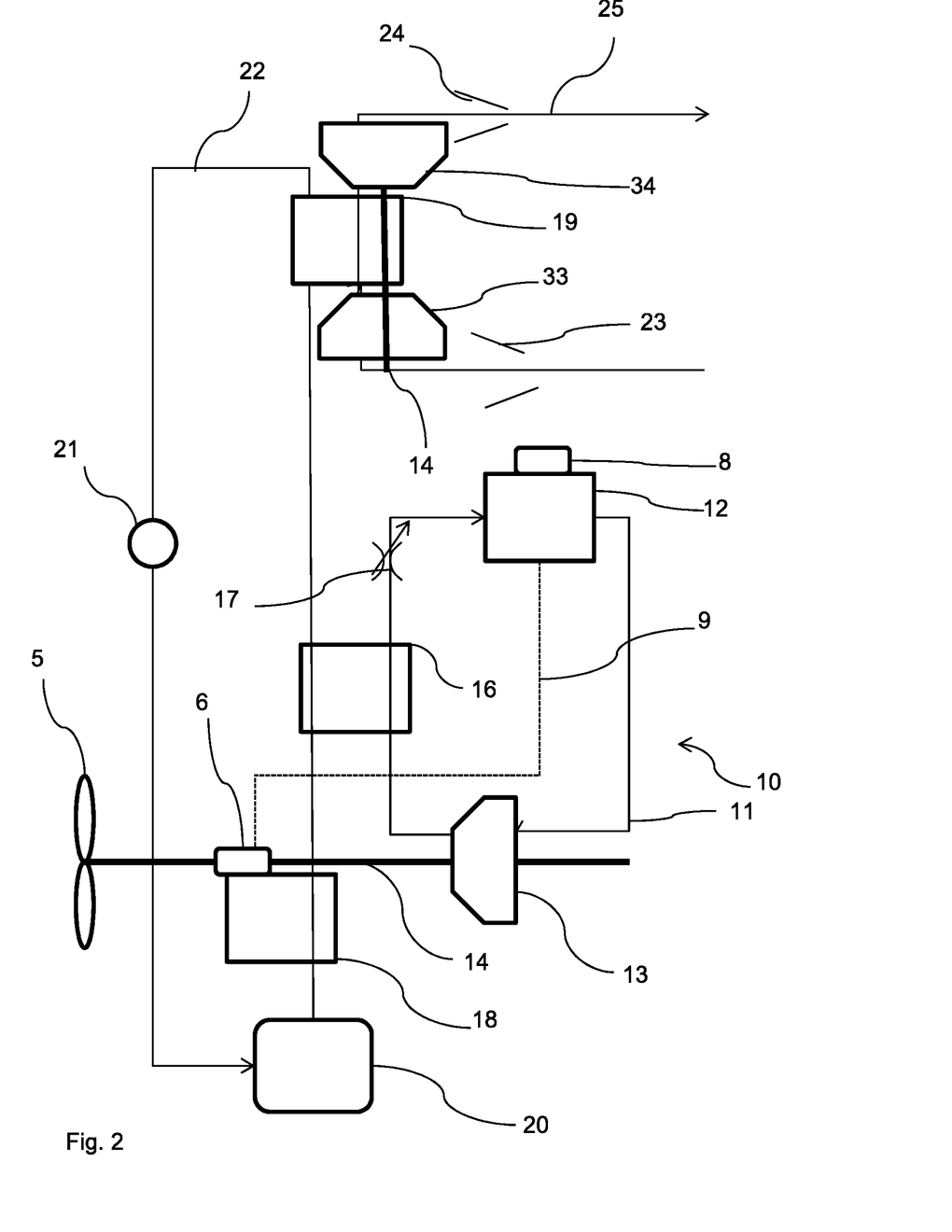
FIG. 2 is a schematic view of an aircraft thermal management system for the aircraft of FIG. 1.

FIG. 2 shows a schematic view of a thermal management/cooling system 10 of the aircraft 1. It will be understood that the arrangement of figure is schematic only, and does not necessarily represent the physical arrangement of the various components or their relative positions. Referring to FIG. 2, each propeller 5 is driven by a respective electric motor 6 via a first drive shaft 7. The electric motor 6 may comprise any suitable motor, such as an AC or a DC motor, and may include a motor controller (not shown). The motor 6 is provided with electrical power from a battery 8 via an electrical interconnector 9.

Both the battery 8 and the electrical motor 6 requiring cooling, since they generate heat in use, and must be kept below a maximum operating temperature. The battery 8 may also require heating to maintain the battery above a minimum operating temperature, and so the thermal management system may be configured to provide both heating and cooling of one or more components.

Consequently, a thermal management system/cooling system 10 is provided. The cooling system comprises a first cooling loop configured to cool and/or heat a first component in the form of the battery 8. The first cooling loop comprises a first working fluid in the form of a refrigerant such as R134a enclosed within a first working fluid line 11. It will be understood though that other refrigerants may be used. The first cooling loop comprises a first heat exchanger 12 associated with the battery 8. The first heat exchanger 12 is configured to exchange heat between the battery 8 and the first working fluid in the line 11, to thereby maintain the battery 8 within the predetermined temperature limits. At the outlet of the first heat exchanger 12, the first working fluid is at a temperature of approximately 70° C. during normal operating conditions in this example.

Downstream of the first heat exchanger 12 in first working fluid flow is a compressor 13. The compressor 13 is configured to compress the first working fluid to thereby pressurise, heat, and in some cases, liquefy the first working fluid. At the outlet of the compressor 13, the temperature of the working fluid is typically of the order of 100° C. The compressor 13 could be of any suitable type, and is driven by the motor 6 via a shaft 14.

Further downstream in first working fluid flow is a second heat exchanger 16. The second heat exchanger 16 is configured to exchange heat between the warmed, pressurised first working fluid from the compressor 13, and a relatively cooler second working fluid within a second cooling line 22 of a second cooling loop. The second working fluid may again comprise a refrigerant, which may optionally be different from the first refrigerant, or may comprise a liquid working fluid such as water.

Further downstream in first working fluid flow is an expander in the form of a throttle valve 17 (or in some cases a turbine). The throttle valve 17 is configured to expand (i.e. depressurise) the first working fluid, and thereby cool the fluid to a lower temperature than the temperature of the first working fluid at the outlet of the first heat exchanger 12, e.g. to approximately 50° C., to thereby maintain the battery within the predetermined temperature range. Coolant continues to circulate through the first cooling loop in operation, being driven around the loop by the compressor 13.

Turning now to the second cooling loop, a third heat exchanger 18 is provided upstream of the second heat exchanger 16 in second working fluid flow. The third heat exchanger is configured to exchange heat with the motor 6, to thereby cool the motor 6 to maintain the motor below its maximum operating temperature. Second working fluid at the outlet of the third heat exchanger is typically of the order of 85° C., i.e. below the temperature of the first working fluid at the outlet of the second heat exchanger 16, but above the temperature of the first working fluid at the outlet of the first heat exchanger 12. Consequently, the second working fluid can be utilised to cool the first working fluid via the second heat exchanger 16. The temperature of the second working fluid at the outlet of the heat exchanger 16 is typically 90° C., i.e. the second working fluid is warmed slightly after passage through the second heat exchanger 16. In view of the different temperatures of the second working fluid relative to the first, and since the second working fluid preferably does not undergo a phase change during operation, the second working fluid may comprise a different working fluid to the first working fluid, and may comprise water and/or ethylene glycol.

Downstream of the second heat exchanger 16 in second working fluid flow is a fourth heat exchanger comprising a heat exchange matrix 19. The matrix 19 is configured to exchange heat between the second working fluid and a third working fluid. In this embodiment, the third working fluid is air.

After passing through the fourth heat exchanger 19, second working fluid is return to a coolant reservoir 20 via a pump 21, to be used to cool the motor 6 once more.

Referring once more to FIG. 2, the system 10 comprises an air duct 25 which encloses the fourth heat exchanger matrix 19. The air duct 25 is enclosed within the nacelle 4, aft of the propulsor 5. Consequently, the duct 25 is located within the propeller slipstream, such that air flow into the duct benefits from flow-work done by the propulsor 4. The air duct 25 comprises a cooling air inlet 23 in the form of a diffuser having a divergent profile such that subsonic cooling air entering the inlet 23 is slowed and thereby pressurised prior to being heated by the second working fluid within the heat exchanger 19. The duct further comprises an outlet 24 provided downstream in cooling air flow of the heat exchanger matrix 19 and comprising a convergent profile such that heated air downstream of the heat exchanger matrix 19 is reaccelerated by the outlet 24, thereby providing thrust. Consequently, the system 10 utilises waste heat from the motor 6 and battery 8, to thereby provide thrust (or at least reduce the drag from the cooling system), and increase aircraft efficiency.

The air duct 25 further optionally comprises a fan or compressor 33 upstream of the heat exchange matrix 19, configured to at least force air through the duct 25 and the matrix 19. The compressor 33 is also configured to pressurise air as it flows through the duct 25. Consequently, the overall pressure ratio of the divergent inlet 23 and compressor 33 is higher than where the compressor 33 is not provided, thereby increasing the thermal efficiency of the duct 25, and so increasing the thrust generated by the duct. Typically, the compressor 33 has a relatively high pressure ratio (around 2) at full power at sea level static conditions, for reasons that will be explained in further detail below.

The compressor 33 is driven by a turbine 34 provided within the duct, downstream of the matrix 19 and upstream of the outlet 24. The turbine is configured to rotate, and thereby drive the compressor 33 via the shaft 14 (which is shown in a separate position on the figure for clarity, though it will be understood that the physical components would be arranged such that the shaft 14 interconnects the motor 6, propeller 5, compressor 13, compressor 33 and turbine 34). The compressor 33 is therefore optionally driven by the motor 6 via the shaft 14. The turbine and/or motor 6 may be coupled to the compressor 33 via step up gearing (not shown), configured to rotate the compressor at a higher rotational speed than the turbine 34 and/or motor. In some cases, the motor 6 may directly drive the compressor 33, with step down gearing being provided to the propeller 5, such that the propeller 5 rotates at a slower speed than the motor 6, but the motor rotates at the same speed as the compressor 33. In such cases, the pressure ratio provided by the compressor 33 can be greatly increased in view of the higher rotational speeds, with the motor 6, compressor 33, heat exchanger 19 and turbine 34 operating partly as a motorjet, and partly as a gas turbine engine to provide thrust in flight.

In view of the relatively high compressor 33 pressure ratio and the placement of the air duct 25, a large amount of cooling airflow is provided during static conditions, helping improve component cooling, and reducing the size of the required heat exchange matrix 19. Furthermore, in view of the high compressor 33 pressure ratio, a relatively high overall pressure ratio of the compressor can be achieved, resulting in relatively efficient operation of the air duct, heat exchange matrix, compressor and turbine as a gas turbine engine, thereby providing relatively efficient system level operation, even at static conditions. In order to provide the necessary pressure ratio, the compressor 33 may be geared to turn at a higher speed than the propeller 5. The compressor 33 may comprise any of a single stage fan, a single or multi stage centrifugal compressor, or a multi-stage axial compressor. Where a gearbox is provided, the multi-stage axial flow compressor 33 may comprise alternating compressor rotors and stators, or may comprise contra-rotating rotors. The compressor compression ratio may be controllable by, for instance, variable inlet guide vanes. Since the compressor pressure ratio affects the temperature of the airflow, the compressor ratio may be controlled to provide for an optimum heat exchange efficiency. On the other hand, compressor ratio also affects thermodynamic efficiency of the gas turbine engine. Consequently, the system may be controlled to balance each of these considerations to provide an optimal system level efficiency.

In operation, first and second working fluids flow through their respective cooling loops. First working fluid cools the battery via the first heat exchanger 12, before being compressed and heated by the compressor 13. The compressed first working fluid is then cooled by the second heat exchanger, before being expanded and cooled further by the throttle 17, and returned to further cool the battery 8.

Meanwhile, second working fluid flowing through the third heat exchanger 18 is heated, thereby cooling the motor 6. The heated second working fluid is further heated in the second heat exchanger before being cooled once more in the further heat exchanger, and returned to the coolant reservoir 20 via the pump 21.

Advantageously, only a single air duct 25 and liquid to air heat exchange matrix 19 is required to cool both heat sources 6, 8, which operate at different temperatures. Consequently, weight, volume, aerodynamic drag, and energy use are minimised. Meanwhile, the heat generated by the battery 8 is utilised to provide thrust. Ordinarily, the battery coolant would be at too low a temperature to provide useful thrust using a duct—by raising the temperature to that of the motor coolant, additional thrust is generated, thereby increasing aircraft efficiency.

Furthermore, where the aircraft is operated at low temperatures, heat from elsewhere in the system, e.g. the electric motor or aircraft fuel can be utilised to warm the battery to maintain the battery above the minimum temperature. In some cases, the flow of fluid through the first working fluid line 11 may be reversed, such that the working fluid is compressed by the compressor 13 (thereby warming the fluid), heat is exchanged with the battery in the heat exchanger 12 (thereby warming the battery 8 and cooling the working fluid), before passing through the throttle valve 17 (thereby cooling the fluid to below ambient temperature), before passing through the heat exchanger 16 (thereby heating the working fluid back to ambient temperature). Consequently, the system is configured in this mode to act as an air source heat pump, to thereby heat the battery 8. In this case, heating of the battery can be provided when the aircraft is idle, while utilising less energy than if the battery were to be heated by a resistive heater.

Figure 3:
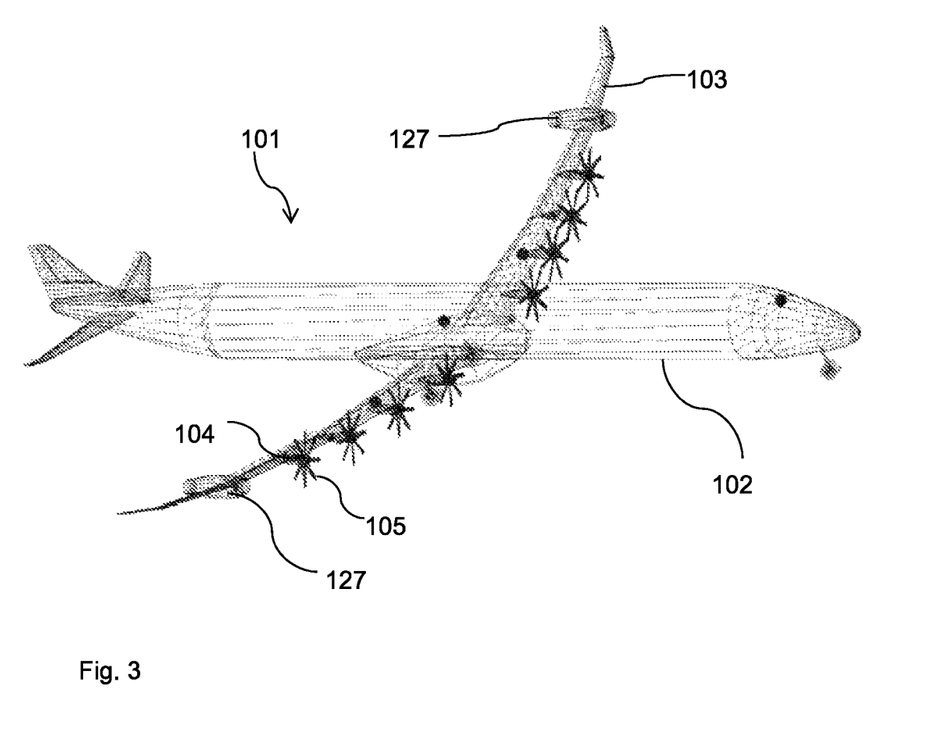
FIG. 3 is a perspective schematic view of an alternative aircraft in accordance with the present disclosure.

Referring to FIG. 3, there is shown an alternative aircraft 101 in accordance with the present disclosure. Again, the aircraft 101 comprises a fuselage 102 with a pair of wings 103 mounted thereto. Propulsors in the form of propellers 105 are mounted to the wings 103 via respective nacelles 104.

Figure 4:
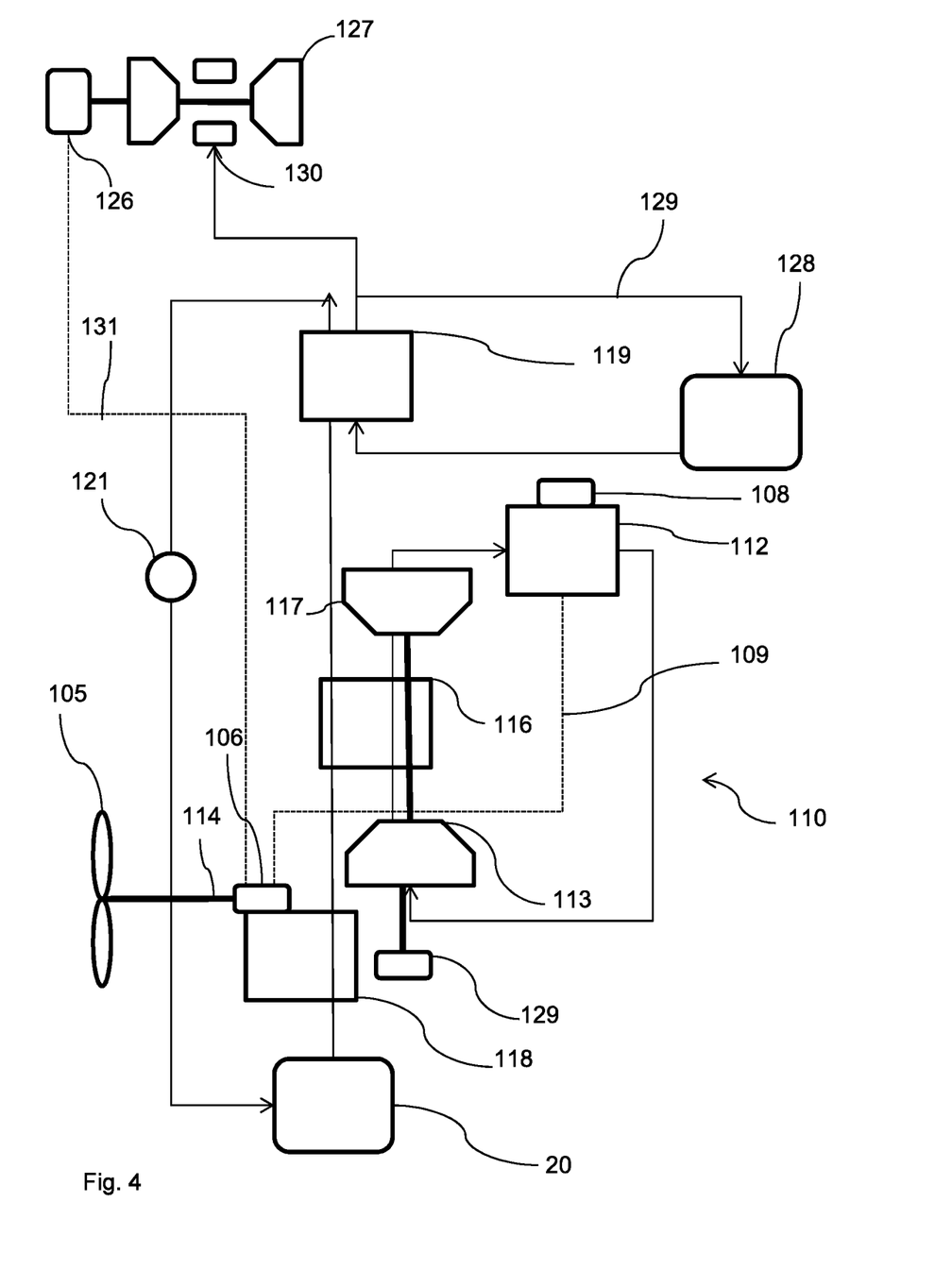
FIG. 4 is a schematic view of an aircraft thermal management system for the aircraft of FIG. 3.

The propellers 105 are again driven by respective electric motors 106, which are provided with electrical power from batteries 108 via a first interconnector 109 and from a pair of electrical generators 126 via a second interconnector 131. The generators 126 are in turn driven by respective gas turbine engine 127. The gas turbine engine 127 runs on liquid fuel such as hydrocarbon jet fuel, or a cryogenic fuel such as liquefied natural gas or hydrogen. The fuel is stored in a fuel tank.

Again, the aircraft comprises a cooling system 110 comprising first and second cooling loops. The first cooling loop comprises a first heat exchanger 112 configured to exchange heat between a first working fluid and the battery 108, a compressor 113 downstream of the first heat exchanger 112 configured to compress the first working fluid, a second heat exchanger 116 downstream of the compressor configured to exchange heat between the first working fluid and a second working fluid, and an expander 117 downstream of the second heat exchanger.

The expander 117 differs from the expander 17 of the first embodiment, in that the expander 117 is in the form of a turbine 117. The turbine is coupled to the compressor 113, such that rotation of the turbine 117 drives the compressor. Further motive power for the compressor 113 is provided by a drive motor 129.

Referring to the second cooling loop, this again comprises a third heat exchanger 118 upstream in second working fluid flow of the second heat exchanger configured to exchange heat between the motor 106 and the second working fluid, a fourth heat exchanger 119 configured to exchange heat between heated second working fluid and a third working fluid, and a pump 121 to recirculate second working fluid.

In this embodiment, the third working fluid is in the form of liquid fuel for the gas turbine engine 127. The fourth heat exchanger 119 is configured to direct heated liquid fuel back to the fuel tank via a return line 129 (potentially via components such as the wing leading edge to provide anti-icing), or to a combustor 130 of the gas turbine engine 127.

Again therefore, a single heat exchanger 119 is required to dissipate heat to the fuel from both the motor 106 and the batteries 108. Ordinarily, it would not be practical to utilise the relatively low grade heat from the batteries. However, in this system, the low grade heat from the batteries can be utilised in the thermodynamic cycle of the engine 127, thereby increasing aircraft efficiency.

Figure 5:
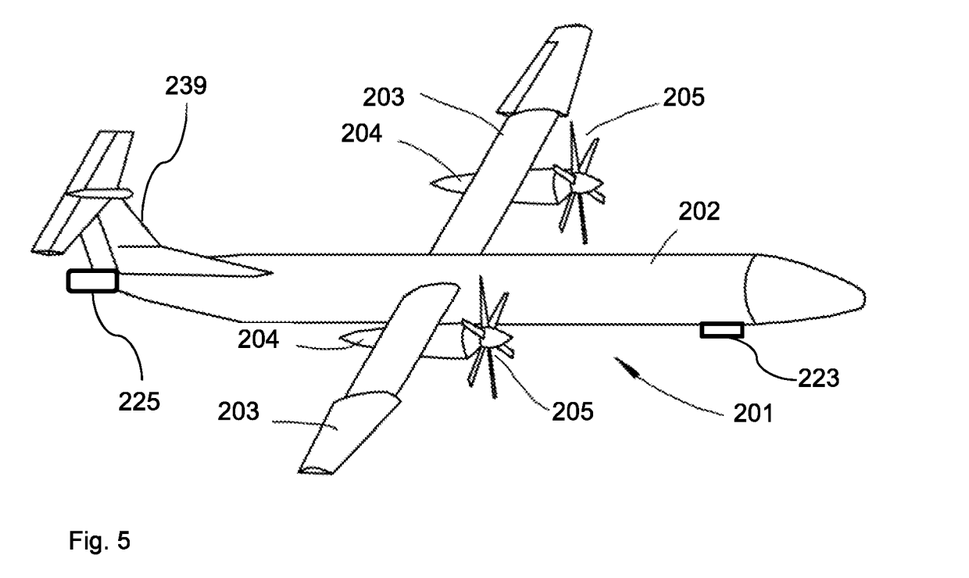
FIG. 5 perspective schematic view of a further alternative aircraft in accordance with the present disclosure.

FIG. 5 shows a further alternative aircraft 201 comprising a fuselage 202 with a pair of wings 203 mounted thereto. Propulsors in the form of propellers 205 are mounted to the wings 203 via respective nacelles 204. The propellers 205 provide propulsive power in flight.

Figure 6:
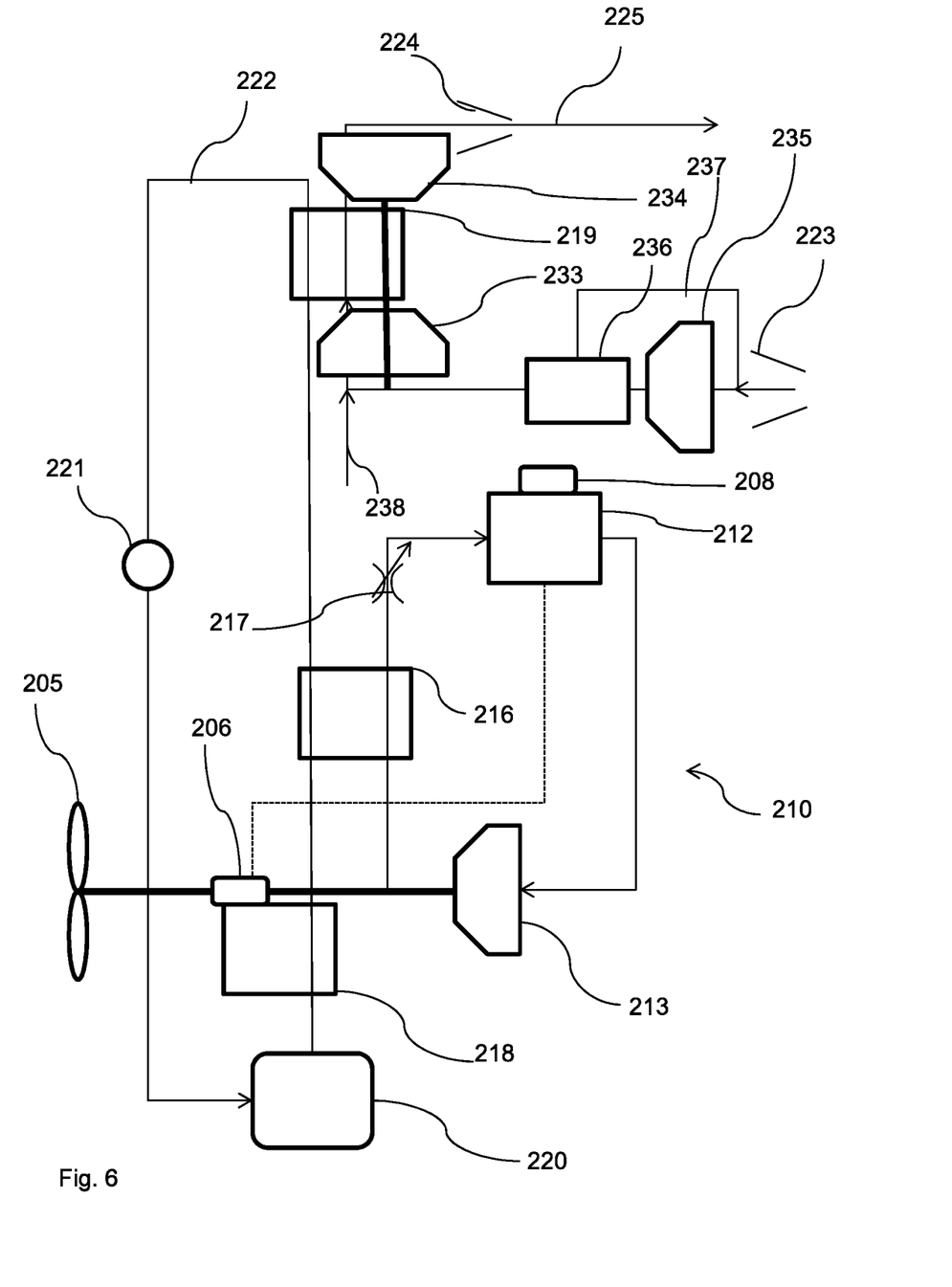
FIG. 6 is a schematic view of an aircraft thermal management system for the aircraft of FIG. 5.

The aircraft 201 further comprises a cooling system 210, shown schematically in FIG. 6. The cooling system comprises first and second cooling loops, similar to those of the arrangement shown in FIG. 2. The first cooling loop comprises a first heat exchanger 212 configured to cool a battery 208, a compressor 213, a second heat exchanger 216 and expander 217, each of which are similar in function to equivalent components 8, 12, 13, 16, 17 shown in FIG. 2. Similarly, the second cooling loop comprises a third heat exchanger 218 configured to cool a motor 206, a fourth heat exchanger 219, a coolant reservoir 220 and a pump 221, which are again similar in function to equivalent components 8, 16, 19, 20, 21 of FIG. 2.

The aircraft further comprises an environmental control system (ECS) comprising a cabin compressor/fan 235. The cabin compressor 235 is configured to draw ambient air through an inlet 223, compress this air to an above ambient pressure, and deliver this air to the passengers and crew within a passenger compartment 236 of the fuselage 202. In some cases, the compressor/fan 235 may not be configured to increase the cabin pressure, but to merely provide for air circulation. Air may be recirculated through the cabin 236 via a recirculation line 237. The ECS may further comprise humidity and temperature control equipment (not shown). An ECS exhaust is output to a compressor 233 provided within an air duct 225 provided at an aft end of the aircraft 201, within a tail 239. A further air duct inlet 238 may be provided, to ingest ambient air where insufficient exhaust air from the ECS is available to provide necessary cooling.

The fourth heat exchanger heat exchange matrix 219 is provided downstream of the compressor 233 within the air duct 225, and upstream of a turbine 234 and an exhaust 224. Again therefore, pressurised air within the duct 225 is further pressurised by a turbine driven compressor 233.

In this embodiment, the overall pressure ratio between the air in duct 225 and the ambient pressure is further increased by the use of ECS exhaust air, thereby further increasing thermodynamic efficiency. Furthermore, the increased pressure air must in any event be provided for the passengers, and so this pressurised air would normally be wasted. It will be understood that the pressurised exhaust air from the ECS may be sufficient, and so the turbine 234 and compressor 233 may be omitted. A still further advantage of this embodiment is that the placement of the air duct exhaust 224 at the rear of the aircraft provides "wake filling" which will be understood to reduce aerodynamic drag of the aircraft, and so still further increase aircraft efficiency.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, where the system includes a fourth heat exchanger to exchange heat between the second working fluid and fuel, a further heat exchanger could be provided to exchange heat between the second working fluid and air, where the thermal capacity of the fuel is exceeded. Other types of compressors could be utilised, such as reciprocating compressors. Further components could be cooled/heated by the system, such as cabin air, engine or gearbox oil, hydraulic systems, avionics, etc., with further cooling/heating loops added as required to accommodate different operating temperature requirements. The heat pump(s) may be operated independently of the propeller, by a separate motor.

It will be understood that different aircraft configurations could be employed, for example a lifting body or blended wing body design, the propellers could be replaced by suitable ducted fans.

Furthermore, while the described embodiments have related to fixed wing aircraft, it will be understood that the disclosure is also applicable to other aircraft types, such as helicopters. Similarly, the disclosure may also be applicable to road vehicles such as cars and trucks, or water vessels, or static installations such as data centres. In low speed or static applications, it may be found preferable to extract turbine work rather than jet thrust from an exhaust nozzle; it will be understood by those skilled in the art that turbines and nozzles are thermodynamically interchangeable.

The invention claimed is:

1. A thermal management system comprising:
    a first heat exchanger configured to exchange heat between a first component and a first working fluid;
    a first working fluid compressor downstream in first working fluid flow of the first heat exchanger and configured to compress the first working fluid;
    a second heat exchanger downstream in the first working fluid flow of the compressor and configured to exchange heat between the first working fluid and a second working fluid, wherein the compressor is between the first heat exchanger and the second heat exchanger in a direction of flow of the first working fluid flow;
    an expander downstream in the first working fluid flow of the second heat exchanger, and configured to expand and cool the first working fluid and deliver cooled first working fluid to the first heat exchanger, wherein the second heat exchanger is between the compressor and the first heat exchanger in the direction of flow of the first working fluid flow;

a third heat exchanger upstream in second working fluid flow of the second heat exchanger, and configured to exchange heat between a second component and the second working fluid; and a fourth heat exchanger downstream in the second working fluid flow of the second heat exchanger configured to exchange heat between the second working fluid and a third working fluid, wherein the second heat exchanger is between the third heat exchanger and the fourth heat exchanger such that the third heat exchanger, the second heat exchanger and the fourth heat exchanger are sequentially positioned in a direction of flow of the second working fluid flow.

2. A system according to claim 1, wherein the first component comprises one or more of a chemical battery and a fuel cell.

3. A system according to claim 1, wherein the second component comprises an electric motor.

4. A system according to claim 1, wherein the expander comprises one of a throttle and a turbine.

5. A system according to claim 1, wherein the expander comprises a turbine, and the turbine is coupled to the compressor by a heat pump shaft.

6. A system according to claim 1, wherein the third working fluid comprises air, and the fourth heat exchanger is provided within an air duct.

7. A system according to claim 6, wherein the air duct comprises a diffuser upstream of the fourth heat exchanger and a convergent portion downstream of the fourth heat exchanger.

8. A system according to claim 6, wherein the air duct comprises an inlet configured to receive exhaust air from a cabin air exhaust of an environmental control system.

9. A system according to claim 6, wherein the air duct is provided having an inlet in a propulsor slipstream.

10. A system according to claim 6, wherein the air duct is provided at an aft portion of an aircraft adjacent a tail.

11. A system according to claim 1, wherein the third working fluid comprises liquid fuel.

12. A vehicle comprising a cooling system according to claim 1.

13. A vehicle according to claim 12, wherein the vehicle comprises an aircraft comprising one or more propulsors driven by a respective electric motor cooled by the cooling system.

14. A vehicle according to claim 13, wherein the electric motor is powered by a battery cooled by the cooling system.

15. A vehicle according to claim 13, wherein the aircraft comprises one or more heat engines configured to drive a generator electrically coupled to the battery and/or the electric motor.

16. A vehicle according to claim 12, wherein the third working fluid comprises liquid fuel for the heat engine.

* * * * *